Sept. 16, 1969  H. W. MOLZAHN  3,466,948
POWER TRANSMISSION CONTROL SYSTEM
Filed Nov. 28, 1967  2 Sheets-Sheet 1
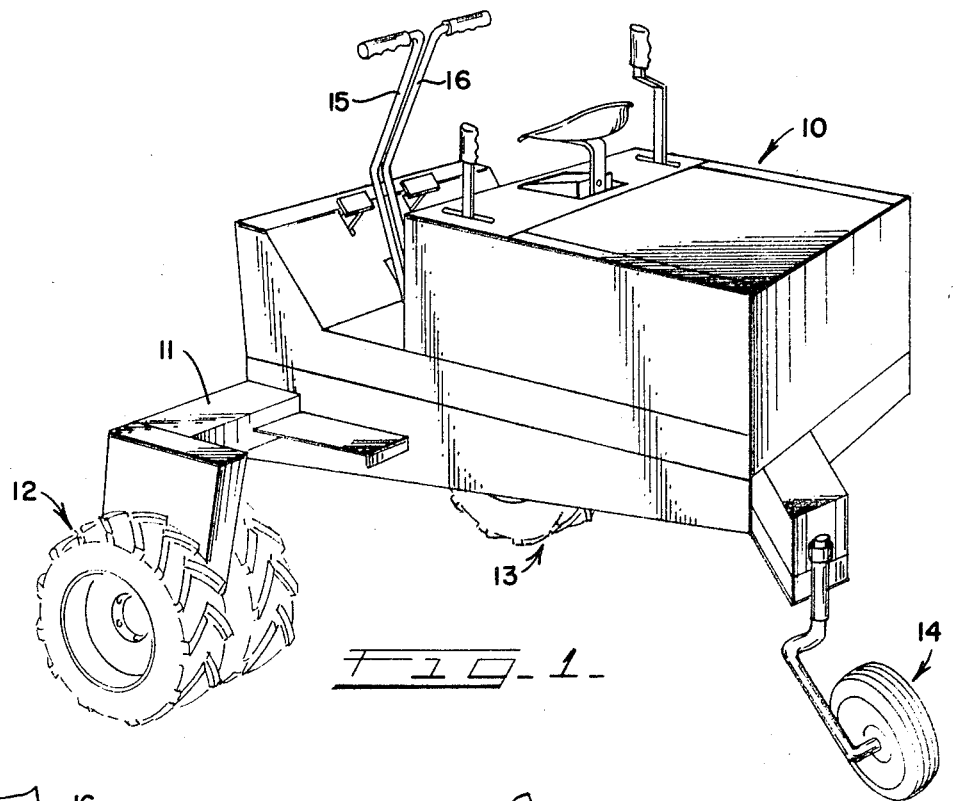
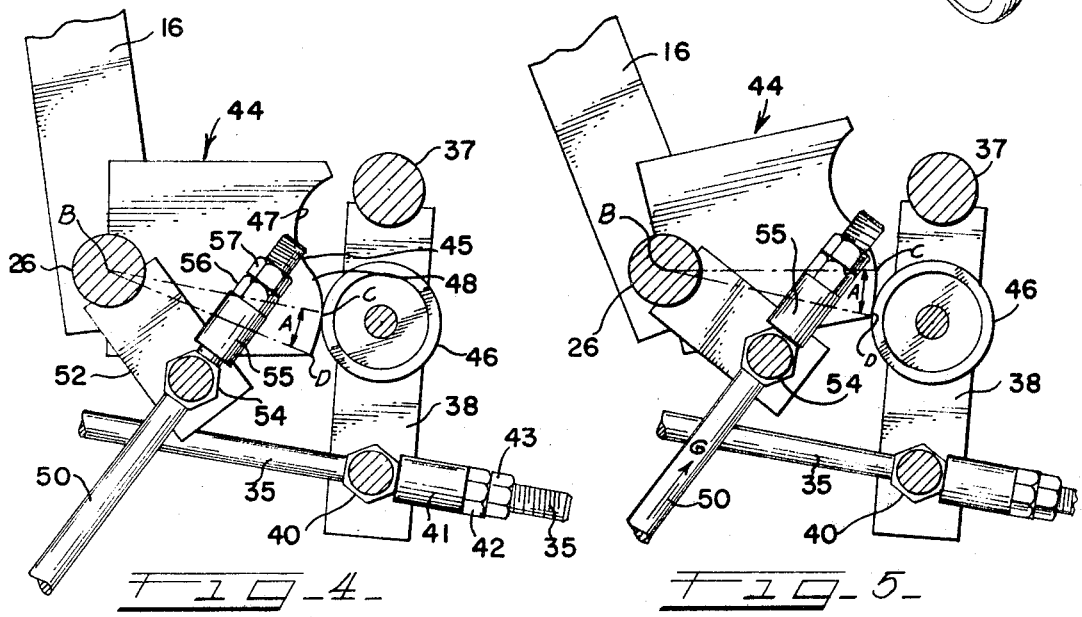
INVENTOR
HERBERT W. MOLZAHN
BY Neal C. Johnson
ATT'Y.

Sept. 16, 1969        H. W. MOLZAHN        3,466,948
POWER TRANSMISSION CONTROL SYSTEM
Filed Nov. 28, 1967        2 Sheets-Sheet 2
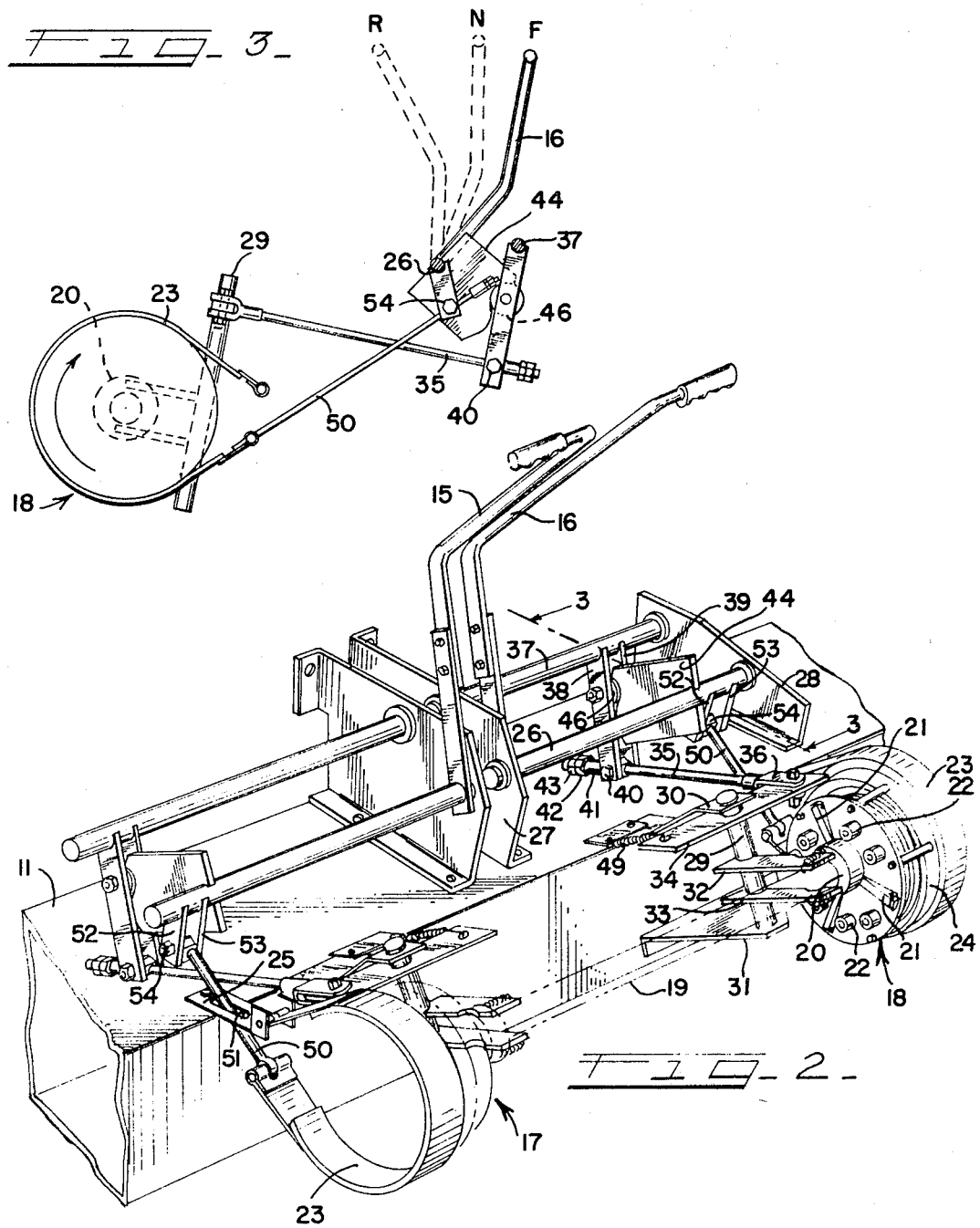
INVENTOR
HERBERT W. MOLZAHN
BY Neal C. Johnson
ATT'Y.

3,466,948
POWER TRANSMISSION CONTROL SYSTEM
Herbert W. Molzahn, Hamilton, Ontario, Canada, assignor to International Harvester Company, Chicago, Ill., a corporation of Delaware
Filed Nov. 28, 1967, Ser. No. 686,203
Int. Cl. F16h 57/10
U.S. Cl. 74—792                                                      6 Claims

ABSTRACT OF THE DISCLOSURE

A control system for the conventional planetary transmissions of a self-propelled windrower wherein the clutch and brake of each of a pair of transmissions are operable to incur forward-neutral-reverse drive of the transmission in response to movement of a control lever supported on the windrower. The clutch and brake of each transmission are operably connected to the control lever by respective clutch and brake linkage assemblies which each include a lost-motion mechanism enabling actuation of the clutch to effect neutral drive without actuating the brake and actuation of the brake to effect reverse drive without further actuation of the clutch thereby preventing overloading the clutch and feedback of force to the control lever.

BACKGROUND OF THE INVENTION

This invention relates generally to the control of power transmissions such as those used in vehicles. More particularly the invention relates to a control means for driving, reversing, and steering an agricultural machine of the windrower type for example.

Many self-propelled windrowers are driven and controlled through a pair of planetary type transmissions arranged to drive the respective drive wheel assemblies of the machine. Planetary transmissions used on windrowers conventionally include a clutch mechanism and a brake mechanism operable to effect forward-neutral-reverse drive of the transmission in response to movement of a control lever accessible to the operator. A problem regarding conventional control systems for the transmission resides in the linkage assembly interconnecting the control lever and the clutch and brake mechanism. Typically, rearward movement of the control lever from a forward to a neutral position, actuates the clutch to effect neutral drive in the transmission. Further rearward movement of the lever from its neutral position to a reverse position actuates the brake to effect reverse drive in the transmission. In conventional systems the linkage assembly created a problem in that the movement of the control lever from neutral to reverse to actuate the brake also continued actuation of the clutch. Accordingly, the clutch springs became overloaded due to excessive compression, thereby creating undesirable wear requiring frequent repair or replacement. Moreover, the excessive compression of the clutch springs fed force back to the control lever making it undesirably difficult to pull from neutral to reverse positions. Consequently, operation of the machine became unduly tiring for the operator and also resulted in a loss of ability to positively sense or feel the responsiveness of the machine to the controls.

SUMMARY

The invention provides an improved control mechanism for a planetary transmission of a windrower. The control mechanism includes a control lever pivotally mounted on a support for movement among forward-neutral-reverse positions. A clutch linkage mechanism operatively interconnects the control lever and the clutch portion of the transmission and a brake linkage mechanism interconnects the control lever with the brake portion of the transmission. The clutch linkage mechanism includes a lost-motion device operatively effective to prevent further actuation of the clutch as the control lever is moved from neutral to reverse positions to actuate the brake through the brake linkage mechanism. By virtue of this arrangement, previous problems of overloading and damaging the clutch portion of the transmission are eliminated while also reducing the amount of force required to move the control lever. Moreover, the linkage mechanisms are constructed so that the ability to sense or feel the responsiveness of the machine to the controls is retained throughout all movements of the control lever.

BRIEF DESCRIPTION OF THE DRAWINGS

FIGURE 1 is a perspective view of a self-propelled unit of a windrower;

FIGURE 2 is a fragmentary perspective view illustrating the control mechanism of the invention;

FIGURE 3 is a somewhat diagrammatic view of a portion of the control mechanism taken generally in the direction of arrows 3—3 of FIGURE 2;

FIGURE 4 is a fragmentary enlarged view taken generally in the direction of arrows 3—3 of FIGURE 2 illustrating a portion of the control mechanism in neutral position; and FIGURE 5 is a fragmentary enlarged view similar to FIGURE 4 illustrating a portion of the control mechanism in a reverse position.

DESCRIPTION OF THE PREFERRED EMBODIMENT

Referring first to FIGURE 1, there is shown a tractor or self-propelled unit 10 of the type on which a windrower platform (not shown) may be mounted by well known connecting means. The basic framework of the self-propelled unit 10 includes a front frame member 11 extending transversely of the unit under the operator's station. A pair of drive wheel assemblies 12 and 13 are coupled to opposite ends of the frame member 11 for driving the machine, and a caster type wheel 14 supports the rear of the machine as shown. The self-propelled unit 10 is adapted to be steered and controlled by means of a pair of control levers 15 and 16 individually operable to control the power drive to the drive wheel assemblies 12 and 13, respectively.

Referring now to FIGURE 2, the improved control mechanism of the invention will be seen in detail. In accordance with conventional practice and as shown generally, a pair of planetary type transmission units 17 and 18 are suitably mounted rearwardly of the frame member 11 and are positioned coaxially at opposite ends of a common input shaft 19 shown in phantom lines. The input shaft 19 is adapted to be driven from the engine of the self-propelled unit 10. It will be understood that the output from each of the transmission units 17 and 18 is transferred to the drive wheel assemblies 12 and 13, respectively, through suitable power train mechanisms known in the art.

Each of the transmission units 17 and 18 is of conventional design and includes a clutch mechanism operable when engaged to effect forward drive, and when disengaged to effect neutral drive in the transmission unit. As best shown with reference to the transmission unit 18, the clutch mechanism includes a throw-out bearing 20 mounted on the input shaft 19 proximate to a plurality of circumferentially spaced radially disposed thrust arms 21 pivotally mounted on the clutch portion of the transmission unit. A plurality of circumferentially spaced springs 22 are arranged to normally bias the clutch mechanism into an engaged position. The thrust arms 21 and springs 22 are cooperatively arranged in conventional manner such that axial movement of the throw-out bearing 20 against the thrust arms 21 causes the clutch to become disengaged against the force of the springs 22.

Each of the transmission units also includes an expandable and contractible brake band 23 disposed around the periphery of the transmission unit for effecting reverse drive. More specifically the brake band 23 is disposed around that portion of the transmission unit referred to as the planet gear carrier (shown generally at 24) which rotates during forward and neutral drive but which must be held against rotation to effect reverse drive of the transmission unit. A bracket 25 is secured to an end of each brake band 23 and is mounted on the frame member 11 as shown for anchoring the brake band so that the same may be expanded and contracted about the respective transmission unit by a linkage system to be described.

The transmission units 17 and 18 are adapted to be independently controlled through separate and identical systems controlled by the control levers 15 and 16, respectively. Accordingly, a description of one system will suffice for both. The control lever 16 is rigidly connected to a rockshaft 26 pivotally mounted between a pair of support members 27 and 28 mounted on the frame 11 as shown. Accordingly, the control lever is arranged for pivoting movement forwardly and rearwardly with respect to the self-propelled unit 10 of FIGURE 1.

The control mechanism of the invention includes a clutch linkage assembly operatively interconnecting the control lever 16 with the clutch portion of the transmission unit 18. Toward that end a generally vertically disposed rockshaft 29 is pivotally supported between a pair of brackets 30 and 31 mounted on the frame member 11 as shown. A pair of arms 32 and 33 are mounted on the rockshaft 29 and extend outwardly therefrom so as to straddle the input shaft 19 adjacent to the clutch throw-out bearing 20. The arms 32 and 33 are arranged so that pivoting movement of the rockshaft 29 causes the ends of the arms 32 and 33 to oscillate in a direction generally axially of the input shaft 19 so as to move the throw-out bearing 20 to engage and disengage the clutch portion of the transmission unit. The clutch linkage assembly further includes a lever 34 secured to the rockshaft 29 at generally right angles thereto and to which a rod 35 is pivotally connected by a clevis 36.

A rockshaft 37 is pivotally supported between the supports 27 and 28 forwardly of and parallel to the rockshaft 26. A pair of parallel arms 38 and 39 extend downwardly from the rockshaft 37 so as to support a trunnion member 40 journaled therebetween in parallel relation to the rockshaft 37. The trunnion member 40 is bored diametrically for slidably receiving the rod 35 which extends therethrough as shown. A sleeve 41 is mounted on the rod 35 against the trunnion member 40 and is retained on the rod by lock nuts 42 and 43.

The clutch linkage assembly includes a vertically disposed cam plate 44 secured to the rockshaft 26 and extending forwardly towards the arms 38 and 39. As best shown in FIGURE 4 the cam plate 44 terminates in a cam surface 45 which engages a roller 46 journaled between the arms 38 and 39. The cam surface 45 is formed to include a concave portion 47 adapted to receive the roller 46 when the control lever 16 is in a forward position as shown in FIGURE 3. The cam surface 45 further includes a convex lobe 48 extending forwardly from the concave portion 47 for actuating the clutch linkage assembly to disengage the clutch in response to rearward movement of the control lever from its forward to its neutral position. As shown in FIGURE 2 a spring 49 is connected between an end of the lever 34 and the frame 11 and acts through the above described clutch linkage assembly to maintain the roller 46 in engagement with the cam surface 45.

The control mechanism of the invention includes a brake linkage assembly operable to effect reverse drive in the transmission unit in response to movement of the control lever from neutral to reverse position. As shown in FIGURE 2, a rod 50 is pivotally coupled to an end of the brake band 23 and extends upwardly and forwardly through a slot 51 defined through the bracket 25. This arrangement is most clearly shown with reference to the control mechanism for the leftmost transmission unit 17, it being understood that the control mechanism for the rightmost transmission unit 18 includes the same arrangement identified with identical reference numerals where applicable. A pair of parallel arms 52 and 53 extend downwardly from the rockshaft 26 so as to support a trunnion member 54 journaled therebetween in parallel relation to the rockshaft 26. The trunnion member 54 is bored diametrically for slidably receiving the rod 50. As best shown in FIGURE 4, rod 50 extends through the trunnion member 54 for receiving a sleeve 55 and a pair of lock nuts 56 and 57. Accordingly, it will be seen that the rod 50 is coupled to the rockshaft 26 in substantially the same manner as the rod 35 is coupled to the rockshaft 37.

An important feature of the invention resides in the construction of the above described clutch linkage assembly wherein a lost-motion device is incorporated permitting the brake linkage assembly to be actuated to effect reverse drive without further actuating the clutch linkage assembly to thus prevent overloading the clutch and reducing the force required to pull the control lever. As shown in FIGURE 4 the convex lobe 48 includes a substantially circular arcuate portion CD defined substantially equidistantly from the pivotal axis or center B of the rockshaft 26. The manner in which the lost-motion device functions to achieve the desired result will become clear in the subsequent description of the operation of the control mechanism of the invention.

In operation, the input shaft 19 is rotated through a suitable power train from the engine of the self-propelled unit 10. With the control lever 16, for example, in the forward position shown at F in FIGURE 3, the transmission unit 18 will be in forward drive. To effect neutral drive, the control lever 16 is moved rearwardly to the neutral position N which pivots the cam plate 44 upwardly to the position shown in FIGURE 4. This movement causes the roller 46 to ride onto the lobe 48 which thus moves the trunnion member 40 forwardly as the arms 38 and 39 swing about the center of the pivoting rockshaft 37. The engagement of the trunnion member 40 against the sleeve 41 causes the rod 35 to move forwardly. Accordingly, the lever 34 and rockshaft 29 (FIGURE 2) are pivoted and the arms 32 and 33 move the throw-out bearing 20 along the shaft 19 to pivot the arms 21 to disengage the clutch portion of the transmission unit.

The brake linkage assembly is arranged to include a lost-motion connection enabling the above-described actuation of the clutch linkage assembly to be accomplished without actuating the brake linkage assembly to thus prevent premature contracting of the brake band 23 onto the periphery of the transmission unit. As shown in FIGURE 4, the trunnion member 54 slides on the rod 50 and stops short of engagement with the sleeve 55 when the control lever is pivoted to the neutral position shown. Accordingly, the rod 50 is not actuated to contract the brake band.

To effect reverse drive, the control lever 16 is moved rearwardly to the reverse position shown in FIGURE 5 through an angle A. During this movement, the trunnion member 54 engages the sleeve 55 to move the rod 50 in the direction of arrow G. Accordingly, the brake band 23 is contracted onto the periphery of the transmission unit to reverse the drive.

During this reversing step, it will be seen that the roller 46 rides on the arcuate portion CD of the cam surface 45 which is defined substantially equidistantly from the pivot point B. Accordingly, no pivoting motion is imparted to the trunnion member 40 and the clutch linkage is not further actuated. A beneficial result is that the arms 21, springs 22, and associated components of the clutch portion of the transmission unit are not overloaded. Moreover, less force is required to pull the control lever rearwardly to the reverse position.

The control mechanism of the invention is constructed such that the operator retains the ability to positively sense or feel the responsiveness of the self-propelled unit to the controls. A feature contributing to this result is the operation of the spring 49 through the clutch linkage assembly whereby the roller 46 is maintained in engagement with the cam surface 45 throughout movement of the control lever. Consequently, looseness or slack in the linkage assembly is eliminated resulting in a greater sense of "feel" in the controls.

As above mentioned, the arcuate portion CD of the cam surface 45 is defined substantially equidistantly from the pivot point B of the rockshaft 26. The configuration of the arcuate portion CD may be altered slightly so that the distance BD is slightly greater than the distance BC. The effect of such a configuration is that the force of the spring 49 biasing the roller 46 against the cam surface will have a small component tending to move the cam plate from the reverse position of FIGURE 5 to the forward position of FIGURE 1. In practice it has been found that this configuration of the arcuate portion CD produces the above result and yet does not create significant movement of the clutch linkage assembly when the control lever is moved from its neutral to its reverse position.

From the foregoing, it will be appreciated that the clutch and brake linkages are cooperatively arranged to provide a smoothly responsive transition in the operation of the transmission as the control lever is moved selectively among its forward-neutral-reverse positions.

Various other changes may occur to those skilled in the art. The invention is, therefore, not to be thought of as limited to the specific embodiments set forth.

What is claimed is:

1. In a power transmission mechanism including a planetary transmission unit having a clutch and a brake operable to incur forward-neutral-reverse drive of the transmission unit, a control mechanism comprising:
   a support;
   a control lever pivotally mounted on said support for movement among forward-neutral-reverse positions;
   clutch linkage means operatively interconnecting said control lever and the clutch for actuating the clutch in response to movement of said control lever from its forward position to its neutral position thereby effecting neutral drive in the transmission unit; and
   brake linkage means operatively interconnecting said control lever and the brake for actuating the brake in response to movement of said control lever from its neutral position to its reverse position thereby effecting reverse drive in the transmission unit, said clutch linkage means including a lost-motion device enabling movement of said control lever from its neutral position to its reverse position without further actuating the clutch, thereby preventing overload of the clutch and feedback of force from the clutch to said control lever means, said lost-motion device including a cam mounted for pivotal movement with said control lever and a cam follower pivotally mounted on said support in engagement with said cam for movement thereby to actuate the clutch in response to movement of said control lever from its forward position.

2. The subject matter of claim 1, in which said cam includes a peripheral concave portion for receiving said cam follower when said control lever is in its forward position and further having a peripheral convex lobe extending from said concave portion for moving said cam follower to actuate the clutch in response to movement of said control lever from its forward position to its neutral position, said lobe having a circular arcuate portion defined substantially equidistantly from the pivotal axis of said control lever and along which said cam follower is engageable without actuating the clutch as said control lever is moved from its neutral position to its reverse position.

3. In a power transmission mechanism including a planetary transmission unit having a clutch and a brake operable to incur forward-neutral-reverse drive of the transmission unit, a control mechanism comprising:
   a support;
   a control lever pivotally mounted on said support for movement among forward-neutral-reverse positions;
   clutch linkage means operatively interconnecting said control lever and the clutch for actuating the clutch in response to movement of said control lever from its forward position to its neutral position thereby effecting neutral drive in the transmission unit; and
   brake linkage means operatively interconnecting said control lever and the brake for actuating the brake in response to movement of said control lever from its neutral position to its reverse position thereby effecting reverse drive in the transmission unit, said clutch linkage means including a lost-motion device enabling movement of said control lever from its neutral position to its reverse position without further actuating the clutch, thereby preventing overload of the clutch and feedback of force from the clutch to said control lever means, said lost-motion device including a cam mounted for pivotal movement with said control lever and a cam follower assembly engaging said cam and movable thereby to actuate the clutch in response to movement of said control lever from its forward position to its neutral position, said cam including a convex lobe having an arcuate portion defined substantially equidistantly from the pivotal axis of said control lever and along which said cam follower is engageable without actuating the clutch as said control lever is moved from its neutral position to its reverse position.

4. A control mechanism for a transmission unit operable in forward-neutral-reverse drive, comprising:
   a support;
   control means swingably mounted on said support for movement among forward-neutral-reverse positions;
   first linkage means operatively interconnecting said control means and said transmission unit for effecting neutral drive thereof in response to movement of said control means from its forward position to its neutral position;
   second linkage means operatively interconnecting said control means and said transmission unit for effecting reverse drive thereof in response to movement of said control means from its neutral position to its reverse position, said second linkage means including a lost-motion connection enabling movement of said control means from its forward position to its neutral position to actuate said first linkage means without actuating said second linkage means, and said first linkage means including a lost-motion device enabling movement of said control means from its neutral position to its reverse position to actuate said second linkage means without further actuating said first linkage means.

5. The subject matter of claim 4 including means biasing said control means to its forward position.

6. The subject matter of claim 4, in which said lost-motion device includes a cam mounted for pivotal movement with said control means and a cam follower assembly pivotally mounted on said support in engagement with said cam for movement thereby to actuate said first linkage means in response to movement of said control means from its forward position to its neutral position, said cam including a convex lobe having an arcuate portion along which said cam follower assembly is engageable as said control means is moved from its neutral position to its reverse position thereby permitting actuation of said second linkage means without further actuating said first linkage means.

References Cited

UNITED STATES PATENTS

| | | | |
|---|---|---|---|
| 657,464 | 9/1900 | Sloan | 74—792 |
| 1,168,762 | 1/1916 | Tuttle | 74—792 |
| 3,132,539 | 5/1964 | Hotz | 74—792 |

ARTHUR T. McKEON, Primary Examiner

U.S. Cl. X.R.

192—98